(12) United States Patent
Gross et al.

(10) Patent No.: US 8,086,477 B2
(45) Date of Patent: Dec. 27, 2011

(54) SYSTEM FOR CREATING MAINTENANCE PLANS

(75) Inventors: Wolfgang Gross, Erlangen (DE); Bernd Kerl, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 1240 days.

(21) Appl. No.: 11/351,106

(22) Filed: Feb. 9, 2006

(65) Prior Publication Data

US 2006/0184411 A1 Aug. 17, 2006

(30) Foreign Application Priority Data

Feb. 14, 2005 (EP) .................................. 05003081

(51) Int. Cl.
*G06Q 10/00* (2006.01)
(52) U.S. Cl. ..................... 705/7.12; 705/7.11; 702/184
(58) Field of Classification Search ................. 705/7.11, 705/7.12, 7.13; 702/184
See application file for complete search history.

(56) References Cited

U.S. PATENT DOCUMENTS

| | | | | |
|---|---|---|---|---|
| 5,216,612 | A * | 6/1993 | Cornett et al. ................... | 700/96 |
| 5,970,437 | A * | 10/1999 | Gorman et al. ............... | 702/184 |
| 6,006,171 | A * | 12/1999 | Vines et al. .................... | 702/184 |
| 6,810,406 | B2 * | 10/2004 | Schlabach et al. ............ | 707/201 |
| 6,816,815 | B2 * | 11/2004 | Takayama ...................... | 702/184 |
| 7,031,941 | B2 * | 4/2006 | Garrow et al. .................... | 705/50 |
| 2002/0007237 | A1 * | 1/2002 | Phung et al. ..................... | 701/33 |
| 2002/0030100 | A1 * | 3/2002 | Katayanagi et al. ........... | 235/380 |
| 2002/0143421 | A1 | 10/2002 | Wetzer | |
| 2003/0150908 | A1 * | 8/2003 | Pokorny et al. ............... | 235/375 |
| 2004/0254764 | A1 | 12/2004 | Wetzer et al. | |
| 2005/0187739 | A1 * | 8/2005 | Baust et al. .................... | 702/184 |
| 2006/0041459 | A1 * | 2/2006 | Hester et al. ...................... | 705/8 |

FOREIGN PATENT DOCUMENTS

| | | |
|---|---|---|
| EP | 1 331 534 A2 | 7/2003 |
| GB | 2 176 637 A | 12/1986 |
| WO | WO 01/63436 A1 | 8/2001 |
| WO | WO 02/097682 A1 | 12/2002 |

OTHER PUBLICATIONS

Developing an Effective Condition Based Maintenance Program for Substation Equipment. Frimpong, G., Taylor T. 2003 Rural Electric Power Conference. Papers Presented at the 47th Annual Conference (Cat. No. 03CH37467). p. c6-1-9, IEEE, Piscataway, NJ, 2003.*

* cited by examiner

*Primary Examiner* — Beth V Boswell
*Assistant Examiner* — Stephanie Zagarella

(57) ABSTRACT

The invention relates to a system and a method for creating maintenance plans for machines and/or installations simply, dynamically and at low cost, in particular an automation system from production automation and/or process automation. The said machines and/or installations comprise one or more components, wherein the components contain maintenance information, and wherein the system has a device for generating a maintenance plan by combining the maintenance information of the components.

11 Claims, 3 Drawing Sheets

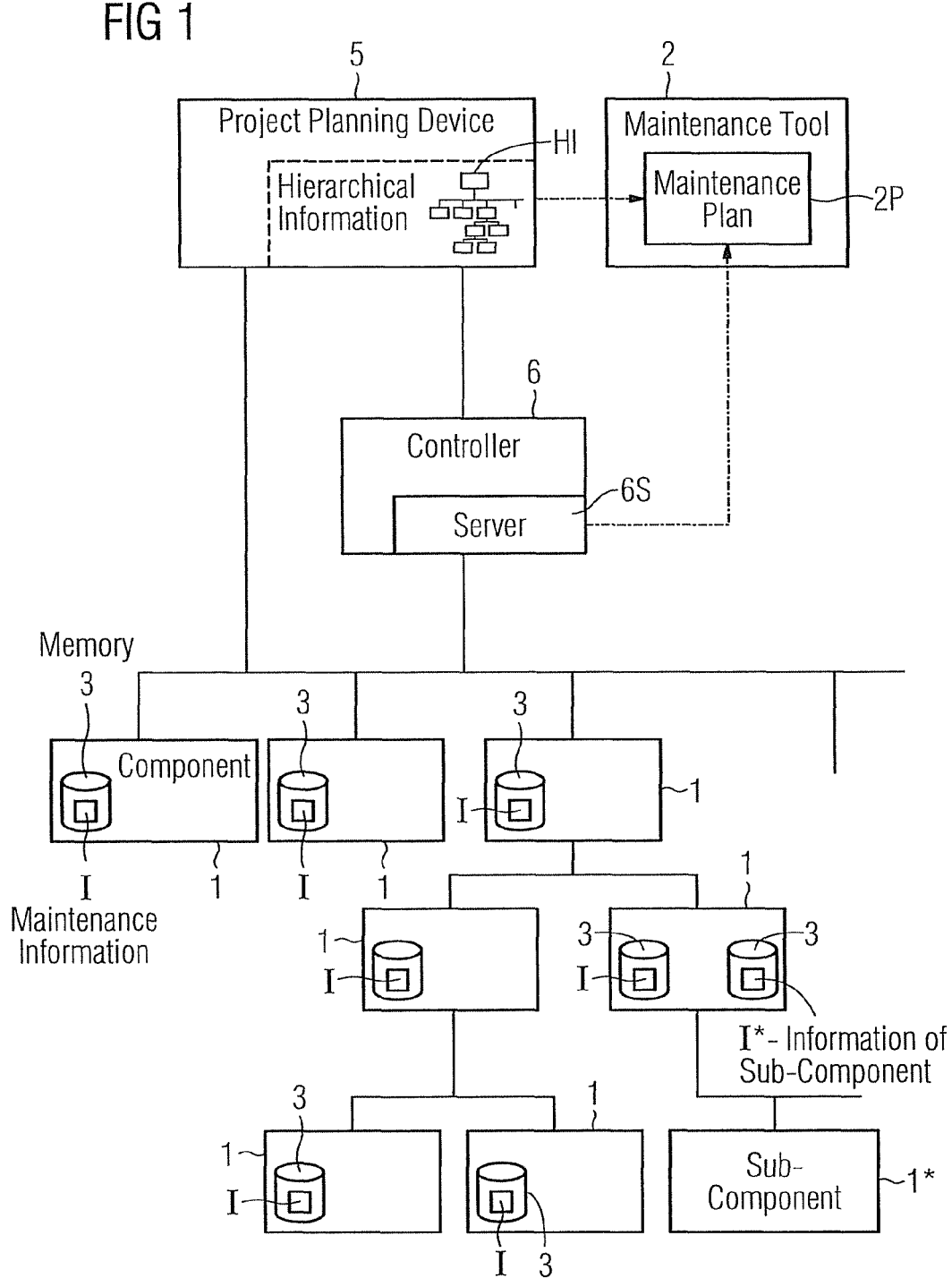

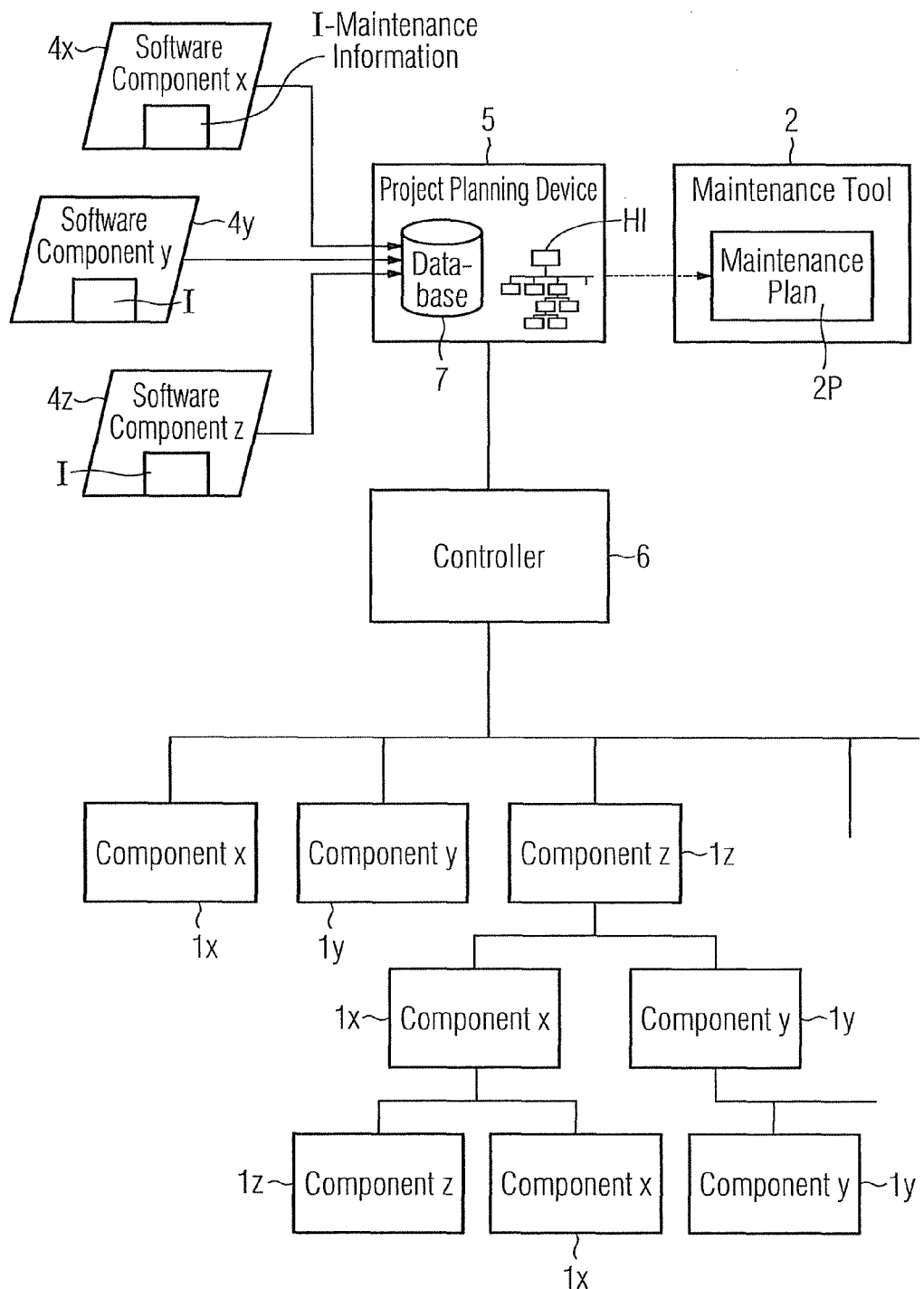

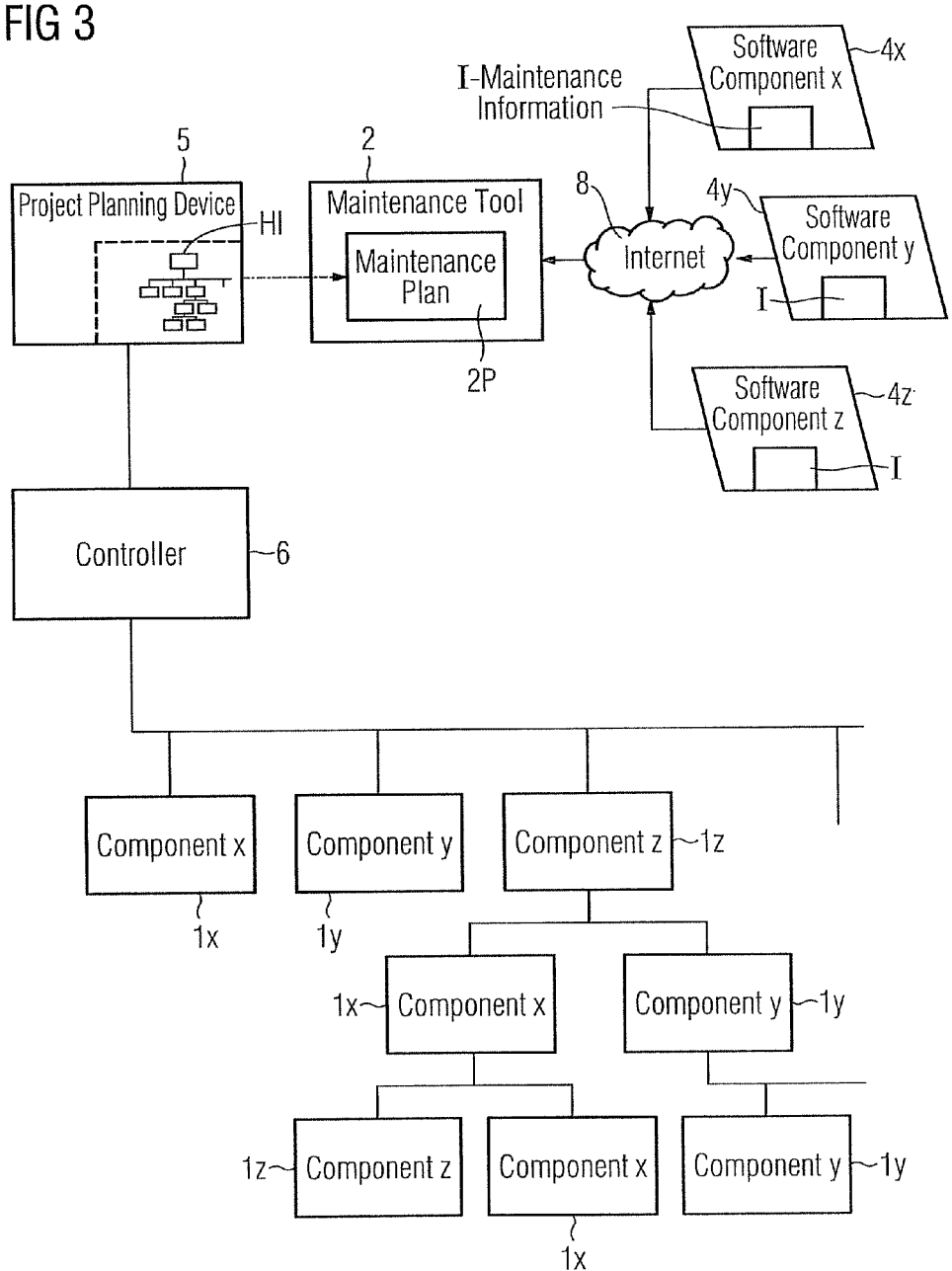

SYSTEM FOR CREATING MAINTENANCE PLANS

CROSS REFERENCE TO RELATED APPLICATIONS

This application claims priority to the European Application No. 05003081.6, filed Feb. 14, 2005 which is incorporated by reference herein in its entirety.

FIELD OF INVENTION

The invention relates to a system and a method for creating maintenance plans for machines and/or installations.

BACKGROUND OF INVENTION

In the servicing and maintenance of plant or machinery in the industrial sector, maintenance is nowadays often carried out as a form of prevention. The time-based approach is usually applied here, in which maintenance activities relevant to the individual components making up the installation or the machine are performed periodically on the basis of a customized time scale.

SUMMARY OF INVENTION

A more advanced version of servicing or maintaining installations and machines is "performance-based" implementation of the preventive maintenance. In this case, instead of a fixed time scale being used for defining the maintenance cycle, the maintenance cycle is specified on the basis of a specific item of performance executed by the installation or the machine or the respective components. For example, a maintenance action on an actuator drive is performed after a specified adjustment path has been performed.

The maintenance process includes combining into "maintenance plans" the maintenance activities to be carried out for the components of an installation or a machine. Maintenance plans also comprise, in addition to the prescribed maintenance cycles or performance criteria, the documentation for carrying out the maintenance actions, maintenance personnel requirements, necessary tools, spare parts and any other additional resources that may be required. Nowadays, maintenance plans are created by the installation designer, who must take into account the characteristics of all the components used and supplied by component manufacturers, and plan appropriate maintenance actions.

To create the maintenance plans, today's installation designer gathers the maintenance information provided by the component manufacturers for the components, which is normally contained in the component documentation. The installation designer puts this maintenance information together manually into maintenance plans, for example on the basis of the design of the installation. To create the maintenance plans, the maintenance information of the components must be analyzed and combined in such a way that its content is standardized and consistent throughout the installation. If a new installation is built and new components are used in it, the maintenance plans for the installation must be modified accordingly. This generates a large amount of work, especially for custom machinery builders and installation designers. The maintenance plans must likewise be replaced or modified after components are replaced at the end customer's premises.

Today, maintenance plans must accordingly be created manually and with the aid of documentation for the individual components of the installation or the machine. In addition, maintenance plans must be re-created for each new installation, resulting in high costs.

An the object of the present invention is to describe a system and a method that can be used to enable maintenance plans to be created simply, dynamically and at low cost.

The object is achieved by a system for creating maintenance plans for machines and/or installations, in particular an automation system from production automation and/or process automation, wherein the machines and/or installations comprise one or more components, wherein the components contain maintenance information, and wherein the system has a device for generating a maintenance plan by combining the maintenance information of the components.

The object is also achieved by a method for creating maintenance plans for machines and/or installations, in particular an automation system from production automation and/or process automation, in which the machines and/or installations comprise one or more components, in which the components contain maintenance information, and in which a maintenance plan is generated by combining the maintenance information of the components.

The invention is based on the realization that maintenance plans can be created far more simply if the requirements and information for carrying out the maintenance, which are necessary for the maintenance plans, are no longer contained in a set of documentation, but are part of intelligent components that make up the installations or machines. This maintenance information may be, for example, maintenance intervals (time-based or performance-based), the type of actions to be carried out or the instructions for carrying out the actions. Personnel requirements and necessary tools can likewise be stored as information directly at the components. Spare parts lists, workflows for step-by-step guidance of the service engineer and device documentation can also be provided directly by the components. This maintenance information can be created in any description language such as, for example, XML or even in ASCII format. Other description languages are also possible, although they are not listed here individually.

The advantage of information for performing the maintenance being part of intelligent components lies in the fact that the appropriate maintenance information is available more quickly when needed. This means that traceable and transparent maintenance plans can be created. It enables maintenance plans to be optimized simply on the basis of the maintenance requirements of the individual components. Likewise, maintenance plans can be adapted easily to the new circumstances after conversions or additions to installations or machines. The plans are available in a structured and electronic form, and can be re-used in higher-level maintenance systems such as enterprise asset management systems. This creates opportunities to make comparisons even between installations. A performance-based or status-based maintenance is supported by the provision of the maintenance information by the components themselves.

This results in potential savings to industry in the creation of maintenance plans, especially in the design of installations. In addition, the maintenance plans are no longer created by individual members of staff from the accompanying documentation itself; instead they are created in a traceable and objective way, since the information required for the maintenance is brought along directly by the components or is assigned to the components. In addition, this produces a simple opportunity to compare the maintenance costs of the individual components. By storing electronically and using the information provided by the components, it is also possible for this information to flow back to the installation designer or into development.

The maintenance information of the components can here be held either directly in the memory of the physical components or in software supplied with the component.

In addition to the maintenance information for itself, an automation component can also contain the maintenance information for mechanical components to which it is connected. For example, a frequency inverter can contain the maintenance information for itself and for the motor that it drives.

The maintenance information can grow as larger components are developed. For example, a pump manufacturer may use a frequency inverter that contains the maintenance information for itself. The pump manufacturer adds the maintenance information for motor and working machine. The complete pump is then used by the installation designer in an installation. The complete pump as a component then contains the maintenance information compiled at various times during its development.

The maintenance information is provided by the components, e.g. via web server/HTML pages contained in the components, via TCP/IP, Profinet or via other transmission paths.

The maintenance information of the individual components can be combined into a maintenance plan via a maintenance tool, i.e. a device for generating a maintenance plan. To do this, the device for generating a maintenance plan or, as the case may be, the maintenance tool uses the hierarchical information contained in a project planning and control system (technology hierarchies, component hierarchy), for example, in order to combine the maintenance information on the basis of the design of the machine or the installation. Alternatively, the maintenance tool can also use the information contained in layouts or circuit diagrams in order to create the maintenance plan from the maintenance information of the components. The maintenance tool determines the optimum maintenance cycles from the information of the components and the data from the project planning and control system, combining as many individual tasks as possible into task blocks.

The maintenance tool also creates training programs and tool lists from the maintenance personnel and tooling requirements contained in the components. Both the various component types and the quantities of the integrated components are taken account of to do this. The requirements are combined and optimized by the maintenance tool.

The user can use the maintenance tool to modify maintenance information for components to suit his requirements. If required, the maintenance tool can apply to all identical components present in the installation the changes that were made, and can also log the changes. The maintenance tool manages the maintenance plans uniquely and in a traceable way.

Using the system according to the invention or using the method, new opportunities relating to providing information for maintenance tasks can be implemented. For example, maintenance information can be provided via the web. The final link in the complete engineering chain, namely the necessary maintenance information, is provided by the facility for maintenance information to be added at various points in time to the individual components that are later combined into larger, complex installation parts, and for this information to be combined subsequently.

The facility to carry out component-based maintenance using the system and method helps to achieve as finely-tuned an implementation as possible of the necessary maintenance actions, thereby achieving a reduction in lifecycle costs. The fact that automation components are becoming increasingly intelligent with greater communications capability supports the procedure of the components themselves providing the maintenance information. Using the Ethernet at the field level also provides a powerful communications medium. It is particularly advantageous that the maintenance information can also be provided online by the components. This allows, for example, an installation designer not present on-site to update in his documents the maintenance information on certain components. This information can then be assigned via the web to the components forming part of an installation. This updated information can then be integrated in a maintenance plan using the maintenance tool, i.e. a maintenance plan can be kept permanently up-to-date on the basis of this information.

Dynamic adaptation of the necessary maintenance actions is made possible by the system. By this means it is also possible to use information from the project planning and control system to create maintenance plans. The system enables an update of relevant information by feedback from the installation to the remotely located installation designer or even to the project planner.

To summarize, the maintenance tool enables an automated creation and optimization of installation maintenance plans, where maintenance intervals, the type of actions to be performed, instructions on carrying out the actions, personnel and tooling requirements and the necessary work steps for carrying out the maintenance task are taken into account. Owing to the fact that the components bring along their maintenance information directly and provide the maintenance tool with this information, an update of maintenance plans after replacing a component or adding a component to the installation is possible at the press a button.

All installation components used in the automation field are possible as components that bring along or provide their maintenance information. The components may, for example, be field devices such as actuators and sensors, or else drives, pumps or complex machines. Likewise, individual parts or more complex combinations of transport or distribution systems are to be viewed as components in the context of the system according to the invention.

Further advantageous embodiments of the invention are given in the dependent claims.

BRIEF DESCRIPTION OF THE DRAWINGS

The invention is described and explained in more detail below with reference to the exemplary embodiments shown in the figures, in which FIG. 1 shows a schematic diagram of the system for creating maintenance plans having storage of the maintenance information in the components, FIG. 2 shows a schematic diagram of the system for creating maintenance plans having maintenance information of the components in external data records, FIG. 3 shows a schematic diagram of the system, in which maintenance information of the component types is provided by internet.

DETAILED DESCRIPTION OF INVENTION

FIG. 1 shows the system for creating maintenance plans for machines or installations, where the system comprises a plurality of components 1. The components 1 contain maintenance information I, which is available in structured form and belongs to the respective component. The maintenance information I is combined via a device 2 for generating a maintenance plan 2P. In this process, the maintenance information I of the individual components 1 is combined by the device 2 for generating a maintenance plan 2P. Components 1 can also contain, in addition to their own maintenance information I, maintenance information I* for each of their sub-components 1*, where the components 1 constitute the representatives in the system for the other sub-components 1*.

The maintenance information I is passed via a controller 6, which has a server 6S, to the maintenance tool, or specifically the device 2 for generating a maintenance plan. The maintenance information I is combined by the device 2 for generating a maintenance plan 2P on the basis of the hierarchical information HI, i.e. the installation structure mapped by the component structure. The hierarchical information HI can be provided by a project planning device 5, for example, which may be an engineering system for instance.

In the exemplary embodiment shown, the maintenance information I is contained in the memory 3 of the components 1. It can be provided online via the controller 6. This can also be done via the web for instance. Alternatively, the maintenance information I can also be read from the project planning device 5, i.e. the engineering system, and made available. The project planning information such as component hierarchy is provided by the engineering system. The maintenance tool 2 combines the maintenance information I of the components 1 and the engineering information to generate a maintenance plan 2P.

FIG. 2 shows a system for generating maintenance plans in which the maintenance information I is contained in the software tools belonging to the components 1 in structured form. For example, these software tools or packages 4x, 4y, 4z assigned to the components 1x, 1y, 1z are saved in a database 7 in the engineering system, or specifically in the project planning device 5. The hierarchical structure, on the basis of which the maintenance information I of the individual installation components 1x, 1y, 1z is combined by the maintenance tool, or specifically the device 2 for generating a maintenance plan 2P, is saved in the engineering system, or specifically in the project planning device 5, for example. In the exemplary embodiment shown, the maintenance tool or specifically the device 2 for generating the maintenance plan 2P is provided with the maintenance information I together with the engineering data mapping the component hierarchy. Here, the maintenance information I can be provided as dedicated software components x4, 4y, 4z or as part of the component specifications within the engineering system. A local database 7 is provided in the engineering system for storing the software 4 assigned to the components 1.

FIG. 3 shows another exemplary embodiment in which the software x4, 4y, 4z assigned to the components 1 and containing the structured maintenance information of the component types 1x, 1y, 1z, is provided via an internet 8 to the maintenance tool or specifically the device 2 for generating a maintenance plan 2P. In this case, the maintenance information I from the manufacturer of the components 1 can be administered, for example, and then provided by internet for use in the device 2 for generating a maintenance plan. The device 2 for generating a maintenance plan 2P receives the hierarchical structure HI of the installation or the machine via the project planning device 5, for example from the engineering system. The maintenance tool 2 determines the component types 1x, 1y, 1z from the information such as manufacturer, component type and order number stored in the engineering system or specifically the project planning device 5. The maintenance tool 2 makes contact with the homepages of the relevant component suppliers, for example, and searches for the maintenance information I associated with the components 1x, 1y, 1z, which is provided in the form of assigned software 4x, 4y, 4z. Then the maintenance information I is downloaded by the device 2 for generating a maintenance plan 2P, i.e. by the maintenance tool. It is then available for creating the maintenance plan 2P.

The invention claimed is:

1. A system for creating a maintenance plan for physical components in an installation, comprising:
   a plurality of components comprising main components and sub-components,
   wherein the main components are intelligent automation components for controlling a technical installation and the sub-components are mechanical components,
      each main component containing maintenance information regarding the respective main component stored directly in the main component's memory, and
      for each main component that is further connected to a sub-component, also containing maintenance information for the sub-component stored directly in the main component's memory,
   wherein the intelligent automation components provide the maintenance information online via Internet such that the maintenance information is accessible on-site as well as off-site of the technical installation;
   a project planning device of an engineering system in communication across a communication network with the main components, the project planning device having stored in memory therein hierarchical information comprising an installation structure for the plurality of components in the installation;
   a maintenance planning device for
      generating a maintenance plan for the installation by receiving the maintenance information from the intelligent automation components, wherein the intelligent automation components transmit the maintenance information via Internet or Ethernet or TCP/IP or Profinet to the maintenance planning device, and
      combining the maintenance information with the hierarchical information from the project planning device to create the maintenance plan,
   wherein the maintenance planning device determines optimum maintenance cycles from the maintenance information, and
   wherein the maintenance planning device is adapted to update the maintenance plan after a component is replaced or added to the installation.

2. The system as claimed in claim 1, further comprising software programs assigned to the main components and having the maintenance information of the respective main component, wherein the software program is adapted to be updated by a manufacturer of the respective main component via the internet, and wherein the software programs are stored directly in the memory of the main component.

3. The system as claimed in claim 1, further comprising at least one circuit diagram including rules for combining the maintenance information of the components.

4. The system as claimed in claim 1, wherein the maintenance plan includes information on maintenance cycles determined from the maintenance information of the components.

5. The system as claimed in claim 1, wherein the maintenance plan includes information on task blocks determined from individual tasks included in the maintenance information of the components.

6. The system as claimed in claim 1, further comprising an editor for modifying the maintenance information of at least one component.

7. The system as claimed in claim 6, wherein the modified maintenance information of the at least one component is also used for such components being identical to the at least one component.

8. A method for creating a maintenance plan for physical components in an installation, the installation having a plurality of components comprising main components and sub-components, the components in communication with a maintenance planning device and a project planning device, the method comprising:

provide and using a plurality of components comprising main components and sub-components, wherein the main components are intelligent automation components, storing maintenance information for each main component directly in a memory of each main component, and for each main component that is further connected to a sub-component, also storing maintenance information for the sub-component directly in the main component's memory, wherein the intelligent automation components provide the maintenance information online via Internet such that the maintenance information is accessible on-site as well as off-site of the technical installation;

providing a project planning device;

storing hierarchical information comprising an installation structure for the components in the installation in a memory of the project planning device;

providing a maintenance planning device which is in communication with the project planning device and the intelligent automation components;

generating a maintenance plan by the maintenance planning device, wherein the intelligent automation components transmit the maintenance information via Internet or Ethernet or TCP/IP or Profinet to the maintenance planning device, and combining the maintenance information with the hierarchical information from the project planning device on a basis of a design of the installation to create the maintenance plan, wherein the maintenance planning device determines optimum maintenance cycles from the maintenance information, and wherein the maintenance planning device is adapted to update the maintenance plan after a component is replaced or added to the installation.

9. The method as claimed in claim 8, wherein the maintenance information of at least one component is included in a software program assigned to the respective main component, the method further comprising updating the software program by a manufacturer of the respective main component via the interne, wherein the software program is stored directly in the memory of the main component.

10. The method as claimed in claim 8, further comprising providing at least one circuit diagram including rules for combining the maintenance information of the components.

11. The method as claimed in claim 8, further comprising modifying the maintenance information of at least one of the components and using the modified maintenance information also for such components being identical to the at least one component.

* * * * *